(12) United States Patent
Teratani et al.

(10) Patent No.: US 8,231,964 B2
(45) Date of Patent: Jul. 31, 2012

(54) ALUMINUM OXIDE SINTERED BODY, METHOD FOR PRODUCING THE SAME AND MEMBER FOR SEMICONDUCTOR PRODUCING APPARATUS

(75) Inventors: Naomi Teratani, Nagoya (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 195 days.

(21) Appl. No.: 12/717,164

(22) Filed: Mar. 4, 2010

(65) Prior Publication Data

US 2010/0227145 A1   Sep. 9, 2010

(30) Foreign Application Priority Data

Mar. 6, 2009   (JP) .................. 2009-054027

(51) Int. Cl.
*C04B 35/10* (2006.01)
(52) U.S. Cl. ........ 428/220; 428/701; 428/702; 501/127; 501/152; 501/153
(58) Field of Classification Search ................ None
See application file for complete search history.

(56) References Cited

U.S. PATENT DOCUMENTS

| | | | |
|---|---|---|---|
| 6,950,297 B2 | 9/2005 | Kosakai | |
| 7,122,490 B2 * | 10/2006 | Kobayashi et al. | 501/98.4 |
| 2002/0032118 A1 * | 3/2002 | Oshio | 501/120 |
| 2004/0171474 A1 * | 9/2004 | Kobayashi et al. | 501/98.4 |

FOREIGN PATENT DOCUMENTS

| | | |
|---|---|---|
| JP | 2003-152065 A1 | 5/2003 |
| JP | 2004-022585 A1 | 1/2004 |

OTHER PUBLICATIONS

S. Kikkawa et al. J. Am. Ceram. Soc., 91 (3), 2008, 924-928.*

* cited by examiner

*Primary Examiner* — Jennifer McNeil
*Assistant Examiner* — Vera Katz
(74) *Attorney, Agent, or Firm* — Burr & Brown

(57) ABSTRACT

An aluminum oxide sintered body is provided, including europium and nitrogen, and plate-like crystals having peaks coinciding with $EuAl_{12}O_{19}$ in an X-ray diffraction profile are dispersed over a whole sintered body. Such an aluminum oxide sintered body can be obtained by forming a mixed powder containing an alumina powder, a europium compound powder and an aluminum nitride powder into a green body having a predetermined shape, and sintering the green body under a non-oxidizing atmosphere.

11 Claims, 3 Drawing Sheets

ALUMINUM OXIDE SINTERED BODY, METHOD FOR PRODUCING THE SAME AND MEMBER FOR SEMICONDUCTOR PRODUCING APPARATUS

FIELD OF THE INVENTION

The present invention relates to an aluminum oxide sintered body, a method for producing the same and a member for a semiconductor producing apparatus.

BACKGROUND OF THE INVENTION

An electrostatic chuck has been used to fix a wafer in a semiconductor producing apparatus. The electrostatic chuck includes an internal electrode for applying a voltage and a dielectric layer stuck on the internal electrode and is configured so that, when a voltage is applied to the internal electrode with the wafer disposed on the electrostatic chuck, an electrostatic chucking force is generated between the dielectric layer and the wafer. There are two types of electrostatic chucks, that is, a monopolar electrostatic chuck having one internal electrode and a bipolar electrostatic chuck having a pair of internal electrodes (namely, two) disposed separately from each other. In the monopolar electrostatic chuck, the electrostatic chucking force is generated when a voltage is applied between the internal electrode and an external electrode disposed outside of the electrostatic chuck. In the bipolar electrostatic chuck, the electrostatic chucking force is generated when a voltage is applied between the pair of internal electrodes.

Electrostatic chucks are roughly divided into Johnson-Rahbek electrostatic chucks in which a dielectric having a volume resistivity of about $10^8$ to $10^{12}$ $\Omega\cdot$cm is used to generate a Johnson-Rahbek force to attract a wafer, and Coulomb electrostatic chucks in which an insulator (having a volume resistivity exceeding $10^{16}$ $\Omega\cdot$cm) is used as a dielectric to generate a Coulomb force to attract a wafer. In a Johnson-Rahbek electrostatic chuck, while a high chucking force is obtained, not only is an expensive power supply having high current capacity necessary but also a slight current flows to a wafer due to a leakage current from the power supply. Accordingly, there is a concern that an integrated circuit formed on the wafer may be electrically damaged. In connection with this, in recent years, Coulomb electrostatic chucks having a lower leakage current are more frequently adopted. However, such a Coulomb electrostatic chuck has a problem in that an electrostatic chucking force is low compared with that of the Johnson-Rahbek electrostatic chuck.

In order to overcome the problem, there have been studies where the volume resistivity of a dielectric was controlled to an appropriate value to increase a chucking force and reduce the leakage current. For example, in Patent Document 1, the volume resistivity is controlled by sintering aluminum oxide with silicon carbide added thereto. Furthermore, in Patent Document 2, the volume resistivity is controlled by sintering aluminum oxide to which magnesium oxide and titanium oxide are added.

[Patent Documents]
[Patent Document 1] Japanese Unexamined Patent Application Publication No. 2003-152065
[Patent Document 2] Japanese Unexamined Patent Application Publication No. 2004-22585

However, the silicon compound and the titanium compound used in the Patent Documents 1 and 2 do not have sufficient corrosion resistance to a fluorine-based corrosive gas or plasma thereof, in particular; accordingly, the wafer may be contaminated with conductive particles thereof.

SUMMARY OF THE INVENTION

By considering this point, the inventors sintered an aluminum oxide green body containing an europium compound that does not affect the corrosion resistance to aluminum oxide. The volume resistivity could be controlled to a value suitable for a Johnson-Rahbek electrostatic chuck, a value suitable for a Coulomb electrostatic chuck or a value therebetween. However, since the volume resistivity largely fluctuates depending on differences in the sintering conditions, a problem occurs in that it is difficult to stably obtain a sintered body having desired volume resistivity. Furthermore, another problem occurs in that the volume resistivity on the inside of the sintered body greatly differs from the volume resistivity on the outside of the sintered body; accordingly, it is difficult to obtain a sintered body having uniform volume resistivity. The problem is particularly significant when the thickness of the sintered body is 10 mm or more.

The present invention is made to solve such problems as mentioned above, and a primary object of the present invention is to provide an aluminum oxide sintered body that has excellent corrosion resistance and is suitable for members such as an electrostatic chuck for a semiconductor device.

In order to achieve the primary object, the inventors added europium oxide as a europium compound to aluminum oxide that is a main component followed by further adding aluminum nitride thereto, and found that the volume resistivity varies in accordance with an amount of added europium oxide. While the volume resistivity greatly varies in relation to a sintering temperature when europium oxide alone is added, a degree of variation thereof is alleviated when aluminum nitride is further added, and the volume resistivity on the inside of the sintered body is substantially equal to the volume resistivity on the outside of the sintered body. Thus, the present invention is completed.

That is, the aluminum oxide sintered body according to the present invention contains europium and nitrogen and has plate-like crystals that exhibit peaks coinciding with $EuAl_{12}O_{19}$ in an X-ray diffraction profile dispersed over the whole sintered body.

Furthermore, a method of the invention for producing the aluminum oxide sintered body includes: mechanical pressing of a mixed powder containing an alumina powder, a europium compound powder and an aluminum nitride powder into a green body having a predetermined shape; and sintering the green body under a non-oxidizing atmosphere to obtain an aluminum oxide sintered body in which plate-like crystals that exhibit peaks coinciding with $EuAl_{12}O_{19}$ in an X-ray diffraction profile are dispersed over the whole sintered body.

The aluminum oxide sintered body of the invention has excellent corrosion resistance because it includes alumina as a primary component and a europium compound instead of a silicon compound and a titanium compound. Furthermore, the volume resistivity of the aluminum oxide sintered body calculated from a current value at 1 min after a voltage of 2 kV/mm is applied at room temperature can be readily controlled so as to be a value from a lower limit of a Johnson-Rahbek electrostatic chuck to a value of a Coulomb electrostatic chuck. As a result, a chucking force stronger than that of a Coulomb electrostatic chuck can be obtained and the leakage current can be reduced to be less than that of a Johnson-Rahbek electrostatic chuck. Furthermore, for the aluminum oxide sintered body of the present invention, a distribution of the volume resistivity over the sintered body is negligible because of the addition of both a europium compound and a nitrogen compound. From these viewpoints, the aluminum oxide sintered body of the present invention is excellent in terms of corrosion resistance and is suitable for a member such as an electrostatic chuck for a semiconductor device.

Furthermore, according to the method of the present invention for producing the aluminum oxide sintered body, the aluminum oxide sintered body is relatively readily obtained by forming a green body of mixed powder containing an alumina powder, a europium compound powder and an aluminum nitride powder, and by sintering the green body under a non-oxidizing atmosphere. Furthermore, by varying the amount of the europium compound added to the alumina, the volume resistivity at room temperature is controlled so as to be various values from a lower limit of a Johnson-Rahbek electrostatic chuck to a value of a Coulomb electrostatic chuck. Still furthermore, since aluminum nitride is also added, when the amount of added europium compound is the same, the volume resistivity on the inside of the sintered body is substantially equal to the volume resistivity on the out side of the sintered body.

DETAILED DESCRIPTION OF THE INVENTION

Figure 1:
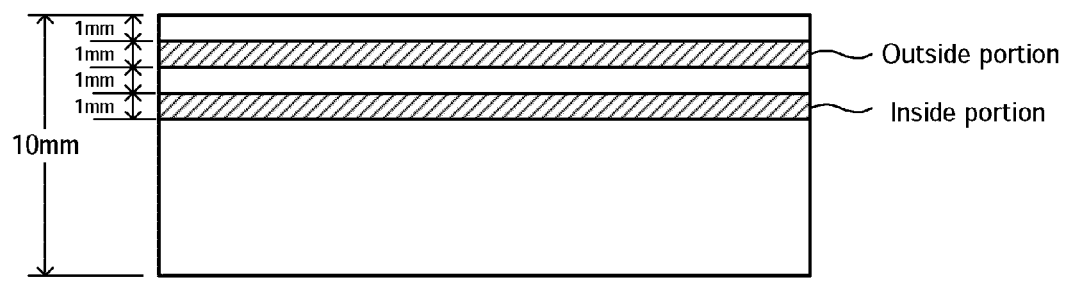
FIG. 1 is an explanatory diagram showing an outside portion and an inside portion of a sample.

An aluminum oxide sintered body of the present invention contains europium and nitrogen and has plate-like crystals that exhibit peaks coinciding with $EuAl_{12}O_{19}$ in an X-ray diffraction profile dispersed over the whole sintered body. The plate-like crystal having peaks coinciding with $EuAl_{12}O_{19}$ is a plate-like crystal whose X-ray diffraction pattern coincides with an X-ray diffraction pattern of the JCPDS card of $EuAl_{12}O_{19}$.

The aluminum oxide sintered body of the invention is preferably devoid of peaks coinciding with $EuAlO_3$ having a perovskite structure in an X-ray diffraction profile over the sintered body. $EuAlO_3$ has a high resistance and the presence of a small amount thereof does not produce a significant adverse effect. However, $EuAlO_3$ is not preferable because $EuAlO_3$ generates a small difference between the volume resistivity on the outside of the sintered body and the volume resistivity on the inside of the sintered body.

The aluminum oxide sintered body of the invention preferably has a thickness of 10 mm or more. In the case where the thickness is 10 mm or more, when only europium is contained, the volume resistivity of the outside of the sintered body and the volume resistivity of the inside thereof tend to differ largely and a distribution of the volume resistivity tends to be generated over the whole sintered body. However, the sintered body of the invention contains nitrogen as well; accordingly, the volume resistivity becomes almost uniform over the whole sintered body. The reason why a distribution of the volume resistivity is generated is considered to be as follows. That is, when the aluminum oxide sintered body contains europium but not nitrogen, the inside of the sintered body contains high-resistance $EuAlO_3$ and the outside thereof negligibly contains such $EuAlO_3$ and contains low-resistance plate-like crystals having peaks coinciding with $EuAl_{12}O_{19}$ dispersed therein; accordingly, a large difference is generated between the volume resistivity of the outside and the volume resistivity of the inside. On the other hand, when both europium and nitrogen are contained, both the inside and the outside negligibly contain $EuAlO_3$ and low-resistance plate-like crystals having peaks coinciding with $EuAl_{12}O_{19}$ are present dispersed over the whole sintered body; accordingly, the volume resistivity on the outside negligibly differs from that on the inside.

The aluminum oxide sintered body of the invention preferably has a thickness of 10 mm or more and a ratio ($\rho in/\rho out$) (inside to outside ratio) of the volume resistivity at room temperature ($\rho in$) of an inside portion from 3 mm to 4 mm in depth from a sintered surface to the volume resistivity at room temperature ($\rho out$) of an outside portion from 1 mm to 2 mm in depth from a sintered surface of 1.5 or less. When the thickness and the ratio of the aluminum oxide sintered body are set as mentioned above, the volume resistivity becomes substantially uniform over the whole sintered body. Accordingly, even when the thickness is reduced by grinding or polishing, the volume resistivity substantially coincides with the volume resistivity initially measured, and variations in the characteristics of products produced from the aluminum oxide sintered body tend not to occur.

The aluminum oxide sintered body of the invention preferably has a volume resistivity at room temperature from $1\times10^8$ to $1\times10^{14}$ $\Omega\cdot cm$. The range of the numerical value covers not only the resistance of a Johnson-Rahbek electrostatic chuck but also resistances between that of a Coulomb electrostatic chuck and that of a Johnson-Rahbek electrostatic chuck; accordingly, a chucking force stronger than that of a Coulomb electrostatic chuck can be obtained and the leakage current can be reduced to be lower than that of a Johnson-Rahbek electrostatic chuck.

The aluminum oxide sintered body of the invention may contain other additives such as a metal oxide as long as it is not an element that causes semiconductor contamination or is not contained to an amount that causes semiconductor contamination. Examples of the metal oxide include, for example, magnesium oxide. However, the content of the components is desirable to be as low as possible from the viewpoint of corrosion resistance.

A member for a semiconductor producing apparatus of the invention is produced by processing the aluminum oxide sintered body of the invention. For example, the aluminum oxide sintered body of the invention can be used as a base material of an electrostatic chuck or can be used as a dielectric of an electrostatic chuck. Specifically, an electrostatic chuck may be produced by embedding an internal electrode in the aluminum oxide sintered body of the invention, may be produced by covering a top surface of an internal electrode with the aluminum oxide sintered body of the invention and by covering a bottom surface and side surfaces of the internal electrode with another sintered body, or may be produced by covering a top surface and side surfaces of the internal electrode with the aluminum oxide sintered body of the invention and by covering a bottom surface of the internal electrode with another sintered body. The electrostatic chuck may be either a monopolar electrostatic chuck or a bipolar electrostatic chuck.

A method according to the present invention for producing an aluminum oxide sintered body includes: forming a mixed powder containing an alumina powder, a europium compound powder and an aluminum nitride powder into a green body having a predetermined shape; and sintering the green body under a non-oxidizing atmosphere to obtain any one of the aluminum oxide sintered bodies of the invention. According to the method, when an amount of a europium compound added to alumina is varied, the volume resistivity at room temperature can be controlled so as to be various values from the lower limit of a Johnson-Rahbek electrostatic chuck to that of a Coulomb electrostatic chuck.

Herein, when a europium compound is used alone, a rate of variation of the volume resistivity to a sintering temperature is too large; accordingly, it is difficult to obtain an aluminum oxide sintered body having the desired volume resistivity. That is, even when amounts of the europium compound added are the same, the volume resistivity varies largely depending on the sintering temperature. On the other hand, according to the method of the present invention, an aluminum nitride powder is added in addition to the europium compound. Accordingly, the rate of variation of the volume resistivity relative to the sintering temperature is kept low and thereby an aluminum oxide sintered body having the desired volume resistivity is readily obtained. That is, in the case where amounts of the europium compound added are the same, even when the sintering temperature varies a little, the volume resistivity does not vary largely, namely, aluminum oxide sintered bodies having the desired volume resistivity are obtained.

In the method of the invention for producing an aluminum oxide sintered body, the mixed powder preferably contains, in terms of oxide, 2.7 to 8 parts by weight of the europium compound relative to 100 parts by weight of alumina. When thus implemented, the above-mentioned inside to outside ratio ρin/ρout readily falls in the range of 1.5 or less; accordingly, a distribution of the volume resistivity over the sintered body is negligible. When a value of the europium compound in terms of oxide is smaller than 2.7 parts by weight, the europium compound is likely to be insufficient and thereby the volume resistivity at room temperature is not sufficiently lowered. On the other hand, even when the europium compound is contained in an amount more than 8 parts by weight, the volume resistivity at room temperature is not lowered more than that; accordingly, it is preferable that the europium compound is not contained in an amount more than 8 parts by weight from an economical viewpoint.

In the method of the invention for producing an aluminum oxide sintered body, a molar ratio of the aluminum nitride powder and the europium compound powder in terms of europium oxide is preferably from 1.7 to 2.6. When the molar ratio is less than 1.7, there is tendency that $EuAlO_3$ having a perovskite structure is unfavorably generated, resulting in a larger dispersion of the volume resistivity. On the other hand, even when the molar ratio is made larger than 2.6, there is no particularly large problem. However, it is not preferable that the molar ratio is larger than 2.6 from an economical viewpoint because aluminum nitride is relatively expensive.

In the method of the invention for producing an aluminum oxide sintered body, the green body is preferably sintered by hot-pressing at a temperature from 1600° C. to 1800° C. When the green body is thus sintered, a dense aluminum oxide sintered body having a relative density of 95% or more is obtained. When the sintering temperature is less than 1600° C., the sintered body is insufficiently densified and thereby the corrosion resistance is unfavorably deteriorated. On the other hand, when the sintering temperature exceeds 1800° C., unfavorably, alumina particle diameters become excessively large and are likely to deteriorate the mechanical strength and the energy consumption necessary for sintering becomes larger, resulting in a higher cost. In the invention, the relative density is obtained according to a method shown below. That is, under the assumption that all of the respective raw materials mixed during production (for example, alumina, europium oxide and aluminum nitride) are present as they are in the sintered body, a theoretical density of the sintered body is obtained from theoretical densities of the respective raw materials and usage amounts (parts by weight) of the respective raw materials. Thereafter, a bulk density obtained by the Archimedes' method is divided by the theoretical density of the sintered body, followed by multiplying by 100, and an obtained value is taken as the relative density (%) of the sintered body.

In the method of the invention for producing an aluminum oxide sintered body, the green body having a predetermined shape is preferably a plate-like form having a thickness of 20 mm or more. When the green body is thus configured, a thickness of the resulting sintered body becomes 10 mm or more and an aluminum oxide sintered body that is thick and does not have a distribution of the volume resistivity at room temperature is obtained.

In the method of the invention for producing an aluminum oxide sintered body, aluminum oxide being used is preferably high in purity, for example, preferably 99% or more in purity and particularly preferably 99.5% or more in purity. The shape of particles of aluminum oxide may be a sphere (spherical or elliptical) or a polyhedron, a polyhedron being preferred.

In the method of the invention for producing an aluminum oxide sintered body, a compounded powder is obtained, for example, by wet mixing a mixed powder containing an alumina powder, a europium compound powder and an aluminum nitride powder in an organic solvent to form a slurry, followed by drying the slurry. In the wet mixing, a mixing and pulverizing device such as a pot mill, a Trommel mill, or an attrition mill may be used. Instead of wet mixing, dry mixing may be used.

In the step of forming the resulted compounded powder, when a plate-like shape is produced, a mechanical pressing method may be used. The pressing pressure is preferably set at 100 $kgf/cm^2$ or more. However, so long as the shape is retained, the pressing pressure is not particularly restricted. The mixed powder itself may be charged into a hot press die. When the pressure during sintering by hot pressing is too low, a green body may not be densified. On the other hand, when the pressure during sintering by hot pressing is too high, closed pores tend to remain and are likely to disturb densification. From these viewpoints, the pressing pressure is set, at least at the maximum temperature during sintering, preferably at a value from 30 to 300 $kgf/cm^2$ and more preferably at a value from 50 to 200 $kgf/cm^2$.

Furthermore, when the sintering temperature is too low, the green body may not be densified. On the other hand, when the sintering temperature is too high, particles of aluminum oxide tend to be too large. From these viewpoints, the sintering temperature is preferably set in the range of 1600 to 1800° C. Still furthermore, the sintering by hot pressing is performed under a non-oxidizing atmosphere (vacuum or inert atmosphere). However, the sintering by hot pressing may be performed in such a manner that a vacuum atmosphere is used from normal temperature to a predetermined temperature (such as 1500° C., 1550° C. or 1600° C.) and an inert atmosphere is used from the predetermined temperature to a sintering temperature and while the sintering temperature is maintained.

The predetermined temperature and the sintering temperature may be the same. Herein, the inert atmosphere may be any atmosphere as long as it is a gaseous atmosphere that does not have an adverse effect on the sintering. Examples of the inert atmosphere include, for example, a nitrogen atmosphere, a helium atmosphere and an argon atmosphere. A time interval for which the sintering temperature is held may be appropriately set by considering a composition and the sintering temperature and may be set in the range of, for example, 0.5 to 10 hr.

EXAMPLES

Examples 1 to 9 and Comparative Examples 1 to 6

Aluminum sintered bodies of Examples 1 to 9 and Comparative Examples 1 to 6 were prepared and evaluated. Contents thereof will be detailed below.

1. Powder of Raw Material

Powders of raw materials shown below were used. A commercially available $Al_2O_3$ powder having a purity of 99.5% or more and an average particle diameter of 0.6 μm was used. A commercially available oxide powder such as europium oxide having a purity of 99.9% or more and an average particle diameter of 2 μm or less was used. An AlN powder containing impurity oxygen of 0.87% by weight and having an average particle diameter of 1.1 μm was used. Average particle diameters of the raw material powders are values measured by a laser diffraction method.

2. Powder Mixture

The respective powders were measured in the parts by weight shown in Table 1 and wet-mixed in a solvent of isopropyl alcohol in a polyethylene pot with alumina pebbles having a diameter of 5 mm for 4 hr. After mixing, a slurry was taken out and dried at 110° C. in a nitrogen stream, followed by sieving with a 30 mesh filter, thereby a compounded powder was obtained. As required, the compounded powder was heat treated in an air atmosphere at 450° C. for 5 hr or more to remove by firing a carbon component mixed thereinto during the wet mixing.

3. Forming

The mixed powder was mechanical pressed by being uniaxially pressurized under a pressure of 200 kgf/cm², whereby a disc-shaped form having a φ of 50 mm was prepared, and the disc-shaped green body was housed in a graphite die for sintering. The thickness of each of the green bodies is as shown in Table 1. The thicknesses were measured with vernier calipers. This time, 70 to 75 g of the mixed powder was used to obtain one green body having a thickness of 20 mm.

4. Sintering

A hot-pressing method was used to perform sintering. The pressing pressure was set at 200 kgf/cm² or less, an atmosphere was a vacuum from room temperature to usually 1600° C. and, thereafter, a nitrogen gas of 1.5 kgf/cm² was introduced until completion of the sintering. The sintering temperature was as shown in Table 1. The sintering was completed by maintaining the sintering temperature for 2 hr.

5. Evaluation The thickness of each of the resulting sintered bodies was measured with vernier calipers, followed by processing for various evaluations, further followed by evaluation of the following.

(1) Bulk Density

The Archimedes' method was used with pure water as a medium.

(2) Mechanical Strength

A four-point bending test was performed based on JIS R1601 and the mechanical strength was calculated. Numerals in Table 1 are shown by rounding off to the first decimal.

(3) Volume Resistivity

The volume resistivity was measured in the atmosphere at room temperature according to a method based on JIS C2141. The shape of a test piece was φ 50 mm×0.5 to 1 mm, and the respective electrodes were made of silver such that a diameter of a main electrode was 20 mm, an inner diameter of a guard electrode was 30 mm, an outer diameter of the guard electrode was 40 mm and a diameter of an applying electrode was 40 mm. An input voltage was set at 2 kV/mm, a current value at 1 min after the voltage was inputted was read, and from the current value the volume resistivity at room temperature was calculated. The volume resistivity at room temperature ρout of the sample is the volume resistivity at room temperature of the outside portion (from 1 mm to 2 mm in depth from the sintered surface) shown in FIG. 1 and the volume resistivity at room temperature ρin of the sample is the volume resistivity at room temperature of the inside portion (from 3 mm to 4 mm in depth from the sintered surface) shown in FIG. 1. The inside to outside ratio ρin/ρout was calculated based on the measurements. In Table 1, as the volume resistivity at room temperature, a value of ρout was adopted.

(4) Crystalline Phase

A crystalline phase was identified with an X-ray diffractometer. Measurement conditions were CuKα, 50 kV, 300 mA and 2θ=10 to 70°. As a measurement device, a rotating target X-ray diffractometer (trade name: RINT, manufactured by Rigaku Corporation) was used. In Table 1, $ReAl_{12}O_{19}$/$ReAl_{11}O_{18}$ represents a structure where added Ce or Pr formed a solid solution or a state where peaks overlapped and were difficult to separate, Re representing a rare earth element such as Eu, Ce, or Pr.

TABLE 1

| | Manufacturing condition | | | | | | | |
|---|---|---|---|---|---|---|---|---|
| | Raw material (parts by weight) | | | | | Molar ratio AlN/ | Sintering temperature | Holding time | Thickness of moled body |
| | $Al_2O_3$ | $Eu_2O_3$ | AlN | $CeO_2$ | $Pr_6O_{11}$ | $Eu_2O_3$ | (° C.) | (h) | (mm) |
| Example 1 | 100 | 2.78 | 0.65 | — | — | 2.01 | 1600 | 2 | 20 |
| Example 2 | 100 | 3.13 | 0.72 | — | — | 1.97 | 1750 | 2 | 20 |
| Example 3 | 100 | 3.49 | 0.81 | — | — | 1.99 | 1750 | 2 | 20 |
| Example 4 | 100 | 4.19 | 0.85 | — | — | 1.74 | 1700 | 2 | 20 |
| Example 5 | 100 | 4.19 | 0.98 | — | — | 2.01 | 1700 | 2 | 20 |
| Example 6 | 100 | 4.90 | 1.14 | — | — | 2.00 | 1600 | 2 | 20 |
| Example 7 | 100 | 4.90 | 1.14 | — | — | 2.00 | 1750 | 2 | 20 |
| Example 8 | 100 | 4.90 | 1.46 | — | — | 2.56 | 1750 | 2 | 30 |
| Example 9 | 100 | 7.04 | 1.64 | — | — | 2.01 | 1700 | 2 | 20 |
| Comparative example 1 | 100 | 4.90 | — | — | — | — | 1750 | 2 | 20 |

TABLE 1-continued

| | | | | | | | | |
|---|---|---|---|---|---|---|---|---|
| Comparative example 2 | 100 | 4.90 | — | — | — | — | 1600 | 2 | 20 |
| Comparative example 3 | 100 | 1.74 | — | 5.14 | — | — | 1600 | 2 | 10 |
| Comparative example 4 | 100 | 1.39 | — | 2.04 | — | — | 1600 | 2 | 20 |
| Comparative example 5 | 100 | 3.49 | — | — | 3.37 | — | 1700 | 2 | 10 |
| Comparative example 6 | 100 | — | — | — | — | — | 1600 | 2 | 20 |

| | Sintered body | | | | | | | | |
|---|---|---|---|---|---|---|---|---|---|
| | Thickness of sintered body (mm) | Bulk density (g/cm$^3$) | Relative density (%) | Volume resistivity ($\Omega \cdot$ cm) | Inside to outside ratio $\rho$ in/$\rho$ out | Mechanical strength (MPa) | Chemical analysis value | | Crystalline Phase (Other than Al$_2$O$_3$) |
| | | | | | | | C (wt %) | N (wt %) | |
| Example 1 | 10 | 4.011 | 98 | 4.9E+15 | 1.2 | 420 | <0.01 | 0.13 | EuAl$_{12}$O$_{19}$ |
| Example 2 | 10 | 4.025 | 98 | 8.3E+13 | 1.3 | 460 | <0.01 | 0.15 | EuAl$_{12}$O$_{19}$ |
| Example 3 | 10 | 4.028 | 97 | 3.6E+11 | 1.2 | 490 | <0.01 | 0.16 | EuAl$_{12}$O$_{19}$ |
| Example 4 | 10 | 4.039 | 97 | 4.0E+10 | 1.5 | 410 | <0.01 | 0.17 | EuAl$_{12}$O$_{19}$, EuAlO$_3$ |
| Example 5 | 10 | 4.041 | 97 | 2.8E+10 | 1.2 | 520 | <0.01 | 0.20 | EuAl$_{12}$O$_{19}$ |
| Example 6 | 10 | 3.964 | 95 | 1.3E+09 | 1.2 | 540 | <0.01 | 0.23 | EuAl$_{12}$O$_{19}$ |
| Example 7 | 10 | 4.045 | 96 | 7.0E+08 | 1.2 | 500 | <0.01 | 0.22 | EuAl$_{12}$O$_{19}$ |
| Example 8 | 15 | 4.042 | 96 | 7.4E+08 | 1.2 | 510 | <0.01 | 0.29 | EuAl$_{12}$O$_{19}$ |
| Example 9 | 10 | 4.078 | 95 | 1.1E+08 | 1.3 | 490 | <0.01 | 0.34 | EuAl$_{12}$O$_{19}$ |
| Comparative example 1 | 10 | 4.046 | 96 | 7.4E+08 | 35 | 320 | <0.01 | <0.01 | EuAl$_{12}$O$_{19}$, EuAlO$_3$ |
| Comparative example 2 | 10 | 4.045 | 96 | 1.2E+10 | 245500 | 520 | <0.01 | <0.01 | EuAl$_{12}$O$_{19}$, EuAlO$_3$ |
| Comparative example 3 | 5 | 4.050 | 96 | 5.9E+13 | 1.7 | — | <0.01 | <0.01 | ReAl$_{12}$O$_{19}$/ReAl$_{11}$O$_{18}$ |
| Comparative example 4 | 10 | 4.019 | 98 | 9.1E+13 | 2.2 | 500 | <0.01 | <0.01 | ReAl$_{12}$O$_{19}$/ReAl$_{11}$O$_{18}$, ReAlO$_3$ |
| Comparative example 5 | 10 | 4.060 | 96 | 2.0E+12 | 20 | — | <0.01 | <0.01 | ReAl$_{12}$O$_{19}$/ReAl$_{11}$O$_{18}$ |
| Comparative example 6 | 10 | 3.966 | 99 | 1.7E+17 | 1.9 | 400 | <0.01 | <0.01 | — |

In Examples 1 to 9, as shown in Table 1, an amount of Eu$_2$O$_3$ added, an amount of AlN added, a sintering temperature and a thickness of a green body were variously varied to produce aluminum oxide sintered bodies. As is obvious from the amounts of Eu$_2$O$_3$ added and the volume resistivities at room temperature of Examples 1 to 9 of Table 1, it is found that as an amount of Eu$_2$O$_3$ added is increased, the volume resistivity at room temperature gradually decreases from 1×10$^{16}$ Ω·cm toward 1×10$^8$ Ω·cm. When the amount of Eu$_2$O$_3$ added is zero (Comparative Example 6), the volume resistivity is the largest. As shown above, by controlling the amount of Eu$_2$O$_3$ added, the volume resistivity can be controlled so as to be a value from the lower limit of a Johnson-Rahbek electrostatic chuck to that of a Coulomb electrostatic chuck; accordingly, a chucking force stronger than that of a Coulomb electrostatic chuck is obtained and the leakage current is reduced to less than that of a Johnson-Rahbek electrostatic chuck.

In each of Examples 1 to 9, AlN was added; accordingly, although a sintered body had a thickness as large as 10 mm or more, a distribution of the volume resistivity over the sintered body tended not to occur. This is supported by the fact that the inside to outside ratios, ρin/ρout, of Examples 1 to 9 were 1.5 or less. From these, the aluminum oxide sintered body of the invention can be said to be excellent in terms of corrosion resistance and is suitable for members such as an electrostatic chuck for a semiconductor device. Herein, a crystalline phase of the whole sintered body of each of Examples 1 to 9 was analyzed on the basis of an X-ray diffraction profile and it was found that plate-like crystals having peaks coinciding with EuAl$_{12}$O$_{19}$ having a β-alumina structure or a magnetoplumbite structure were dispersed. Peaks coinciding with peaks of EuAlO$_3$ that has a highly resistant perovskite structure were not observed except for in Example 4. In Example 4, peaks coinciding with peaks of EuAlO$_3$ were found only a little.

Furthermore, as is obvious from, for example, Example 6 and Example 7, in the case where AlN was added, it was found that as long as the amounts of Eu$_2$O$_3$ added are the same, regardless of whether the sintering temperature is 1600° C. or 1750° C., the volume resistivity at room temperature varies to only substantially two times, that is, an aluminum oxide sintered body having a desired volume resistivity at room temperature can be readily obtained. On the other hand, as is obvious from comparison between Comparative Example 1 and Comparative Example 2, in the case where AlN was not added, it was found that even when amounts of Eu$_2$O$_3$ added are the same, between the sintering temperatures of 1600° C. and 1750° C., the volume resistivity at room temperature varies to substantially 16 times, that is, it is difficult to obtain an aluminum oxide sintered body having a desired volume resistivity at room temperature. Furthermore, in Comparative Examples 1 and 2, the inside to outside ratios ρin/ρout were very large, that is, a distribution of the volume resistivity was generated.

Still furthermore, in Comparative Examples 3 and 4, in place of AlN, CeO$_2$ was added, and in Comparative Example 5, in place of AlN, Pr$_6$O$_{11}$ was added. In Comparative Example 3, irrespective of such a small thickness of a sintered body as 5 mm, the inside to outside ratio ρin/ρout was as large as 1.7. Furthermore, in Comparative Example 4, although the thickness of the sintered body was as large as 10 mm, the same as in the respective Examples, the inside to outside ratio ρin/ρout became even larger such as 2.2. In Comparative Example 5 as well, although the thickness of the sintered body was as large as 10 mm, the same as in the respective Examples, in this case, the inside to outside ratio ρin/ρout became very large such as 20. From these results, it was found that AlN is highly effective at suppressing a distribution of the volume resistivity over the whole sintered body in comparison with $CeO_2$ and $Pr_6O_{11}$.

Figure 2:
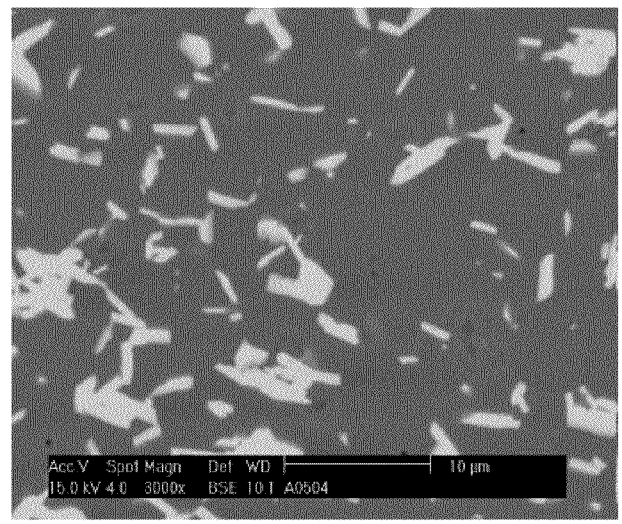
FIG. 2 is a SEM photograph of EXAMPLE 7.
Figure 3A:
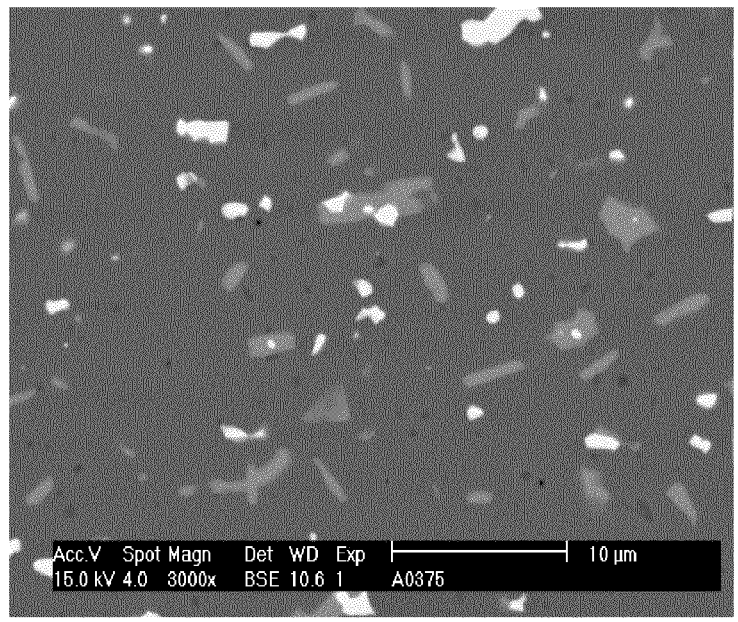
FIG. 3 is a SEM photograph of COMPARATIVE EXAMPLE 2, FIG. 3A showing an inside portion thereof, FIG. 3B showing an outside portion thereof.
Figure 3B:
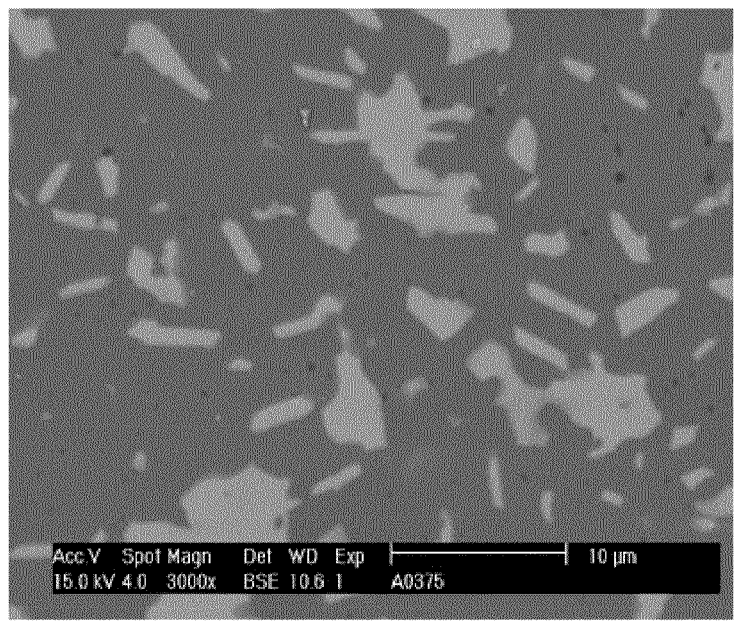
Figure 4:
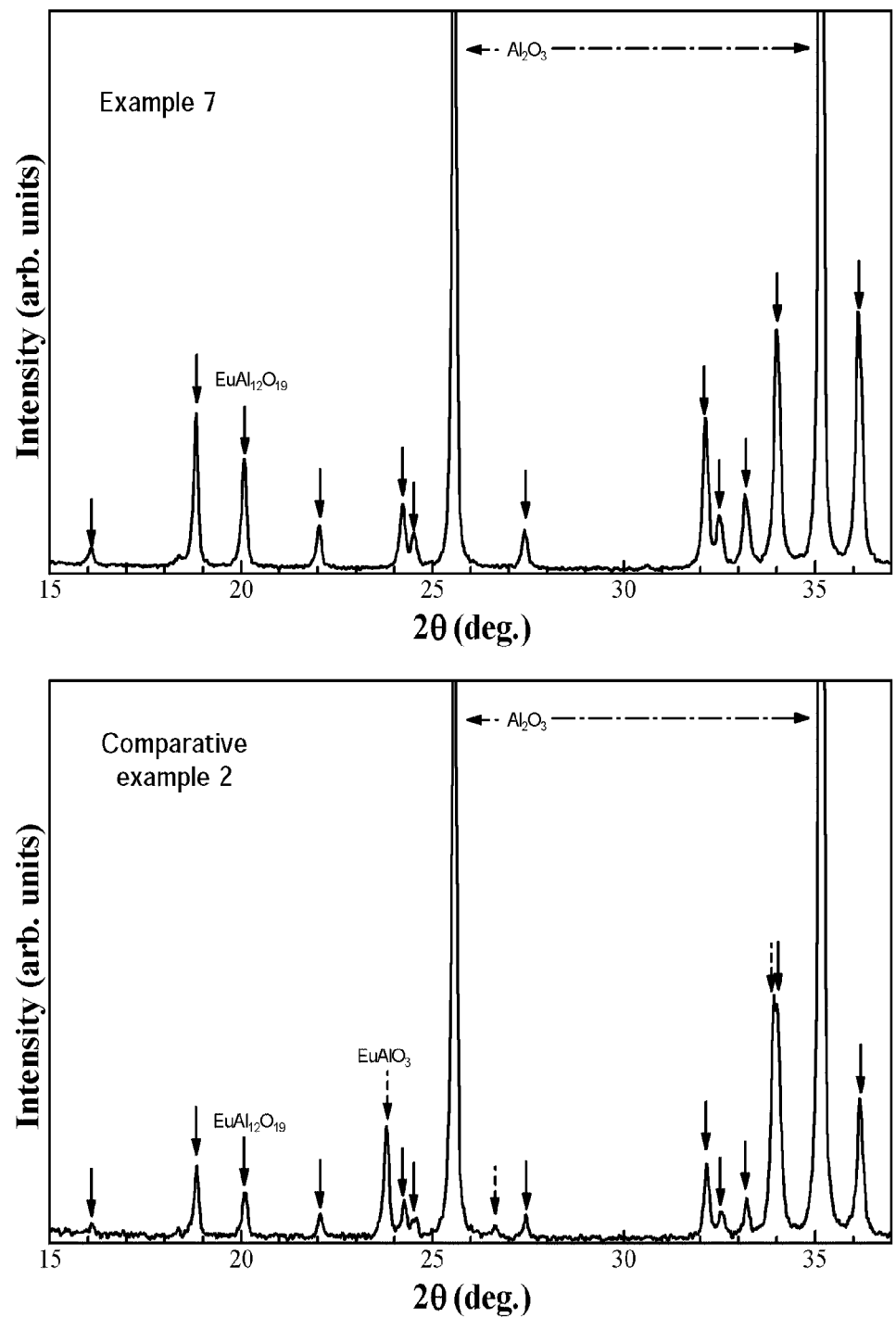
FIG. 4 shows X-ray diffraction profiles of EXAMPLE 7 and COMPARATIVE EXAMPLE 2.

In FIG. 2, a SEM photograph of a mirror-polished cross-section of Example 7 is shown, and, in FIG. 3, SEM photographs of a mirror-polished cross-section of Comparative Example 2 are shown. FIG. 3A is a SEM photograph of an inside portion of Comparative Example 2 and FIG. 3B is a SEM photograph of an outside portion of Comparative Example 2. Of the respective SEM photographs, a dark grey portion forming a background shows $Al_2O_3$, light grey portions scattered in plate show crystals having peaks coinciding with $EuAl_{12}O_{19}$, and brilliant white portions found only in FIG. 3A show crystals having peaks coinciding with $EuAlO_3$. As is obvious from the SEM photographs, in the sintered body of Example 7, $EuAlO_3$ was not present, and plate-like crystals having peaks coinciding with $EuAl_{12}O_{19}$ were dispersed. On the other hand, in Comparative Example 2, in an outside portion, plate-like crystals having peaks coinciding with $EuAl_{12}O_{19}$ were dispersed and crystals having peaks coinciding with $EuAlO_3$ were not present. However, in an inside portion thereof, crystals having peaks coinciding with peaks of $EuAlO_3$ were intermixed. In Example 7, an SEM image the same as that shown in FIG. 2 was obtained over the whole sintered body. FIG. 4 show X-ray diffraction profiles of Example 7 and Comparative Example 2. As is obvious from the FIG. 4, in both of Example 7 and Comparative Example 2, peaks coinciding with that of $EuAl_{12}O_{19}$ are found. Furthermore, in Comparative Example 2, peaks coinciding with that of $EuAlO_3$ are found, however, in Example 7, such peaks are not found.

It will be apparent that the present invention is not limited to the examples described above, and may be embodied in various forms within the technical scope of the present invention.

This application claims priority from Japanese Patent Application No. 2009-054027 filed in the Japanese Patent Office on Mar. 6, 2009, and the entirety of the disclosure of which is incorporated herein by reference.

What is claimed is:

1. An aluminum oxide sintered body containing:
   europium and nitrogen; and
   plate-like crystals having peaks coinciding with $EuAl_{12}O_{19}$ in an X-ray diffraction profile dispersed over the entire sintered body.

2. The aluminum oxide sintered body according to claim 1, wherein a crystal having a peak coinciding with $EuAlO_3$ in an X-ray diffraction profile is not present in the sintered body.

3. The aluminum oxide sintered body according to claim 1, wherein a thickness thereof is 10 mm or more.

4. The aluminum oxide sintered body according to claim 3, wherein a ratio (ρin/ρout) of the volume resistivity at room temperature (ρin) of an inside portion from 3 mm to 4 mm in depth from a sintered surface of the sintered body relative to the volume resistivity at room temperature (ρout) of an outside portion from 1 mm to 2 mm in depth from a sintered surface of the sintered body is 1.5 or less.

5. The aluminum oxide sintered body according to claim 1, wherein the volume resistivity at room temperature is from $1\times10^8$ to $1\times10^{14}$ Ω·cm.

6. A member for a semiconductor producing apparatus obtained by processing the aluminum oxide sintered body according to claim 1.

7. A method for producing an aluminum oxide sintered body, comprising:
   forming a mixed powder containing an alumina powder, a europium compound powder and an aluminum nitride powder into a green body having a predetermined shape; and
   sintering the green body under a non-oxidizing atmosphere to obtain the aluminum oxide sintered body according to claim 1.

8. The method for producing an aluminum oxide sintered body according to claim 7, wherein the mixed powder contains 2.7 to 8 parts by weight in terms of an oxide of the europium compound relative to 100 parts by weight of alumina.

9. The method for producing an aluminum oxide sintered body according to claim 7, wherein a molar ratio of the aluminum nitride powder and the europium compound powder in terms of europium oxide is from 1.7 to 2.6.

10. The method for producing an aluminum oxide sintered body according to claim 7, wherein the green body is sintered by hot-pressing at a temperature from 1600° C. to 1800° C.

11. The method for producing an aluminum oxide sintered body according to claim 7, wherein the green body having a predetermined shape is a plate-like form having a thickness of 20 mm or more.

* * * * *